United States Patent
Stern

(10) Patent No.: US 6,952,415 B2
(45) Date of Patent: Oct. 4, 2005

(54) ALTERNATIVE NETWORK SERVICE FOR VIDEO CONFERENCING APPLICATIONS

(75) Inventor: Jerome S. Stern, Sterling, VA (US)

(73) Assignee: Access Point LLC, Chantilly, VA (US)

(*) Notice: Subject to any disclaimer, the term of this patent is extended or adjusted under 35 U.S.C. 154(b) by 575 days.

(21) Appl. No.: 10/062,560

(22) Filed: Feb. 5, 2002

(65) Prior Publication Data

US 2002/0146011 A1 Oct. 10, 2002

Related U.S. Application Data

(60) Provisional application No. 60/269,538, filed on Feb. 16, 2001.

(51) Int. Cl.[7] ............................................. H04L 12/66
(52) U.S. Cl. .................................... 370/352; 370/395.2
(58) Field of Search ............................ 370/352, 395.2, 370/353, 354, 356

(56) References Cited

U.S. PATENT DOCUMENTS

| | | | | |
|---|---|---|---|---|
| 5,113,499 A | * | 5/1992 | Ankney et al. | ............ 340/5.74 |
| 5,130,984 A | * | 7/1992 | Cisneros | ..................... 370/399 |
| 5,375,118 A | * | 12/1994 | Rao et al. | ................... 370/401 |
| 5,608,425 A | * | 3/1997 | Movshovich | ............... 345/467 |
| 5,610,910 A | | 3/1997 | Focsaneanu et al. | |
| 5,892,924 A | * | 4/1999 | Lyon et al. | .................. 709/245 |
| 6,026,080 A | * | 2/2000 | Roy | ........................... 370/260 |
| 6,141,411 A | | 10/2000 | Robinson et al. | |
| 6,389,130 B1 | * | 5/2002 | Shenoda et al. | ....... 379/221.08 |
| 6,757,285 B1 | * | 6/2004 | Lakhani et al. | .......... 370/395.2 |

FOREIGN PATENT DOCUMENTS

| WO | WO 97/27692 | 7/1997 | |
|---|---|---|---|
| WO | WO9727692 A | * 7/1997 | ........... H04L/12/56 |
| WO | WO 99/66682 | 12/1999 | |

* cited by examiner

Primary Examiner—Huy D. Vu
Assistant Examiner—Daniel Ryman
(74) Attorney, Agent, or Firm—Edell, Shapiro & Finnan, LLC

(57) ABSTRACT

An alternative network service replaces long distance and international ISDN service for H.320 video conferencing applications. The network utilizes ATM technology and high-performance international fiber-optic transmission facilities to provide improved support for these applications. The alternative network service includes access through local ISDN service providers using ISDN dial-out and dial-in server devices to provide routing and called address transfer to the local alternative service gateway. The server devices also provide routing for calls using the ISDN long distance service and reroute capability to backup the alternative network service.

42 Claims, 8 Drawing Sheets

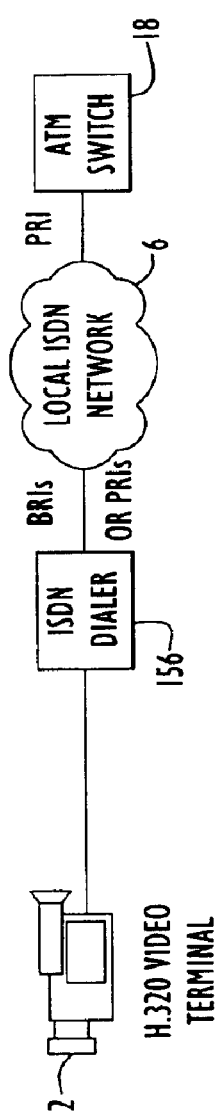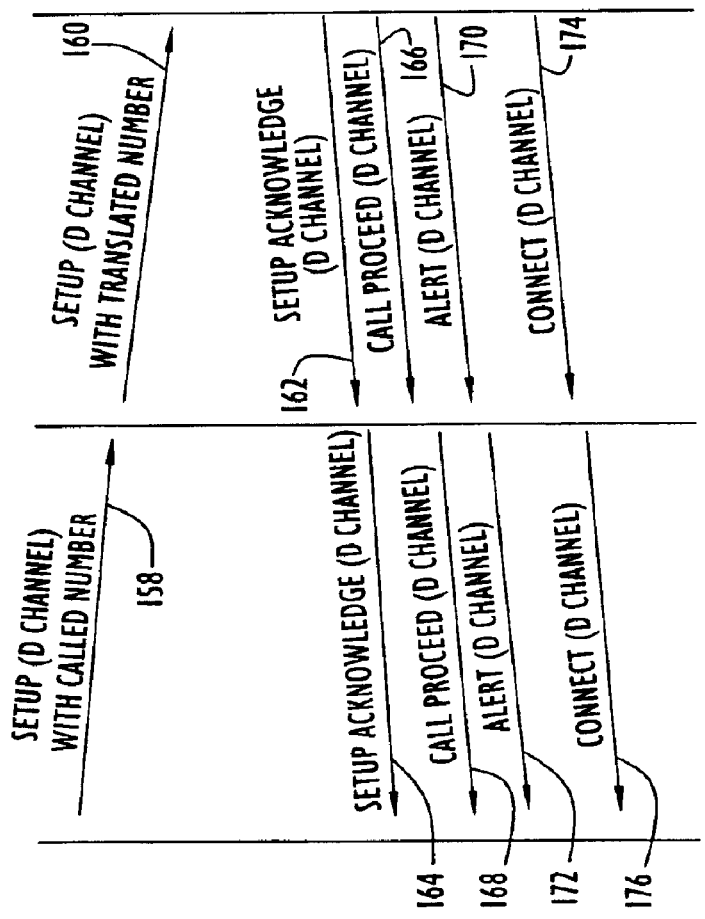

ALTERNATIVE NETWORK SERVICE FOR VIDEO CONFERENCING APPLICATIONS

CROSS REFERENCE TO RELATED APPLICATION

This application claims priority from U.S. Provisional Patent Application Ser. No. 60/269,538, entitled "An Alternative Network Service for Video Conferencing Applications," filed Feb. 16, 2001. The disclosure of that provisional patent application is incorporated by reference here in its entirety.

BACKGROUND OF THE INVENTION

1. Field of the Invention

The invention relates to data communications systems. More particularly, it relates to an alternative international long distance ISDN service for certain applications such as dial-up video conferencing.

2. Description of the Related Art

Integrated Serves Digital Network (ISDN) is a public switched narrowband digital telecommunications service that is available in nearly all developed countries throughout the world. The service is provided on digital telephone switching equipment in 64 kbps duplex channels, and uses conventional copper local distribution plant and digital inter-office facilities for access and transmission. Two interface arrangements are available for user access: Basic Rate Interface (BRI) and Primary Rate Interface (PRI). The BRI consists of two 64 kbps channels, referred to as "B" channels, and a 16 kbps packet switched channel for signaling. This packet switched channel, known as the "D" channel, provides a common channel signaling facility for call setup and control of the B channels. The PRI is configured in two versions depending on the transmission standards employed in the country in which it is located. In North America and some Asian countries the PRI is based on the T1 standard that provides twenty-three 64 kbps B-channels and one 64 kbps D-channel on a 1.544 Mbps facility. European, Latin American and most Asian countries use the E1 standard and the PRI consists of thirty 64 kbps B-channels and one 64 kbps D-channel on a 2.048 Mbps facility. In all cases the B-channels terminate on the central office switch (CO) of the local service provider and are switched and controlled by the user by use of the D-channel. ISDN services are described in ITU Recommendation I.120 (03/93)—Integrated Services Digital Networks (ISDNs), which is incorporated by reference herein for all purposes.

Local service providers offer ISDN services to the general public as an alternative to Plain Old Telephone Service (POTS). ISDN offers enhanced telephone calling features that are not available on the older analog POTS services and even some new data services. For example, a user with a single BRI can set up two simultaneous 64 kbps data calls and then combine them in the user's terminal equipment to provide a single 128 kbps service. Such configuration provides more than twice the maximum data rate that is possible using a single analog POTS line equipped with a modem. ISDN is a superior service for data transmission, which has led to the development of applications that take advantage of that characteristic, such as dial-up videoconferencing.

Videoconferencing technology has evolved over the years to the extent that it can compress the video and audio signals to a level that can be transmitted over relatively narrow bandwidths. For example, the uncompressed digital bandwidth of a standard TV signal is in the range of 270 Mbps. Using data compression techniques, such signals can be reduced as low as 128 kbps for applications that can accept limited image quality and are not required to handle rapid motion. This fits well into a single ISDN BRI, and makes possible dial-up videoconferencing using readily available public switched telecommunications services. If a user wants higher quality, this compression equipment can be configured to provide higher bandwidths in increments of 64 kbps. ISDN can provide the necessary switched 64 kbps channels using multiple BRIs or a PRI. A common configuration operates at 384 kbps and uses three BRIs to derive six 64 kbps B-channels; and such a configuration provides sufficient quality for most videoconferencing applications.

Video codecs for use on ISDN facilities are designed to conform to a standard published by the International Telecommunications Union, this standard is designated ITU Recommendation H.320 (05/99)—Narrow-band Visual Telephone Systems and Terminal Equipment, which is incorporated by reference herein for all purposes. Any H.320 video codec can operate with any other H.320 video codec via B-channel connections through ISDN. Employment of this standard permits codecs made by different manufacturers to engage each other in videoconferencing sessions over ISDN dial-up connections.

However, long distance ISDN services that connect through the transmission facilities of several carriers, particularly international services, often encounter substandard transmission conditions. While these connections may be acceptable for voice communications, they are often unacceptable for data and video applications. In the case of H.320 codecs, the effect is to fail to connect all of the B-channels required for the call resulting in a lower quality video conferencing session. Sometimes long distance ISDN session will setup using all of the B-channels and then drop one or more channels and thereby "down speed" the composite connection during the videoconference session. Accordingly, there is a need for equipment and services to allow videoconferencing applications to operate over long distance ISDN channels, particularly for international dial-up H.320 video conferencing, without suffering the degradation in signal quality that occurs in existing systems.

SUMMARY OF THE INVENTION

To solve these problems alternative transmission arrangements for the long distance portion of the ISDN connections can be used. In one alternative, an international digital switching and transmission network service using asynchronous transfer mode (ATM) switched virtual circuit (SVC) cell switching techniques and very low error rate fiber optic transmission facilities is employed for long distance transmission in place of long distance ISDN. Using this technology, it is possible to emulate ISDN PRI functionality and provide the equivalent of switched 64 kbps channels across the network, that is, between emulated PRI interfaces in and out of the ATM network. These PRI interfaces can be connected to local ISDN services to provide access to customers. Users can access the alternative network service through their local ISDN service using either BRI or PRI access arrangements.

In order to utilize the alternative network service, a method is required for the originating videoconference equipment to access the alternative network through the local ISDN service, and to convey the destination ISDN address to a gateway switch in the alternative network. This need can be met by utilizing dial-out and dial-in server devices. A dial-out server is placed on the user's premises and connects to the BRI (or PRI) ISDN lines on one side, and to the H.320 codec ISDN ports on the other. The dial-in server is located at the alternative service gateway switch site. When the codec signals for a call destination that is better served on the alternative network, the dial-out server holds the call attempt and automatically calls the alternative network gateway switch through the local ISDN service. This call is received and processed by a dial-in server before being forwarded to the switch. After connection to the dial-in server, the dial-out server forwards the ISDN destination address (the called number), and a code that identifies the dial-out server. This identification code can be used for authentication and billing. After the dial-in server receives this information, it signals the ATM switch through the D-channel requesting a call setup to the destination ISDN address. This destination address appears in the called number address field of the signaling message, and the dial-out server ID code appears in the calling number field. The alternative service then completes the call to the destination and produces a call detail record (CDR) for billing.

Employment of the dial-out/dial-in server configuration has several advantages, among which include the following.

1) It is not necessary to change any stored addresses or programming in the originating codec, all codec operating procedures remain. The dial-out/dial-in servers can automatically perform the functions required to access and utilize the alternative network.
2) In the case of destination addresses for local destinations or to far destinations located in countries not served by the alternative service, the dial-out server forwards the address unchanged and the call proceeds over the ISDN network. In effect, the dialer provides a routing function whereby destinations that are best served over the alternative network are automatically routed over the network, and all other addresses are connected via the ISDN network.
3) The dial-out server can be programmed to provide an automatic backup for the alternative service through the ISDN network. If a call attempt through the alternative network fails due to network congestion, the dial-out server can retry the call through the ISDN network.

The invention provides several features, summarized below.

1) An international ATM network is used as an alternative to international ISDN services for the purpose of providing improved performance for H.320 video conferencing and other data applications. Such an ATM network provides switched AAL1 (ATM Adaptation Layer 1) circuit emulation and CBR (constant bit rate) SVC connectivity for 64 kbps channels to emulate ISDN B channels with the necessary signaling capability to inter-work with ISDN signaling and the variants that are utilized by local ISDN service providers.
2) Dial-out/dial-in server devices are employed to facilitate access to the alternative network service through local ISDN networks. The server devices work in concert with an ATM switch in the alternative network service. The ATM switch receives the calls from the dial-in servers and routes those calls through the international ATM network.
3) The dial-out server devices provide routing for calls to either the ISDN network or the alternative network service according to pre-programmed instructions stored in the server devices.
4) The dial-out server devices can be used to provide alternate route backup for calls directed to the alternative service provider that fail to complete due to network congestion or failure. If so programmed, the servers will reroute these calls to the ISDN long distance network.

The aforesaid advantages are achieved individually and in combination, and it is not intended that the invention be construed as requiring two or more of the advantages to be combined unless expressly required by the claims attached hereto.

The above and still further advantages and features of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 9A illustrates a configuration using single ISDN dialer to access an alternative network.

FIG. 9B is a message flow diagram illustrating messages used in setting up a long distance ISDN call using an alternative ATM network shown in FIGS. 8 and 9A.

DETAILED DESCRIPTION

Figure 1:
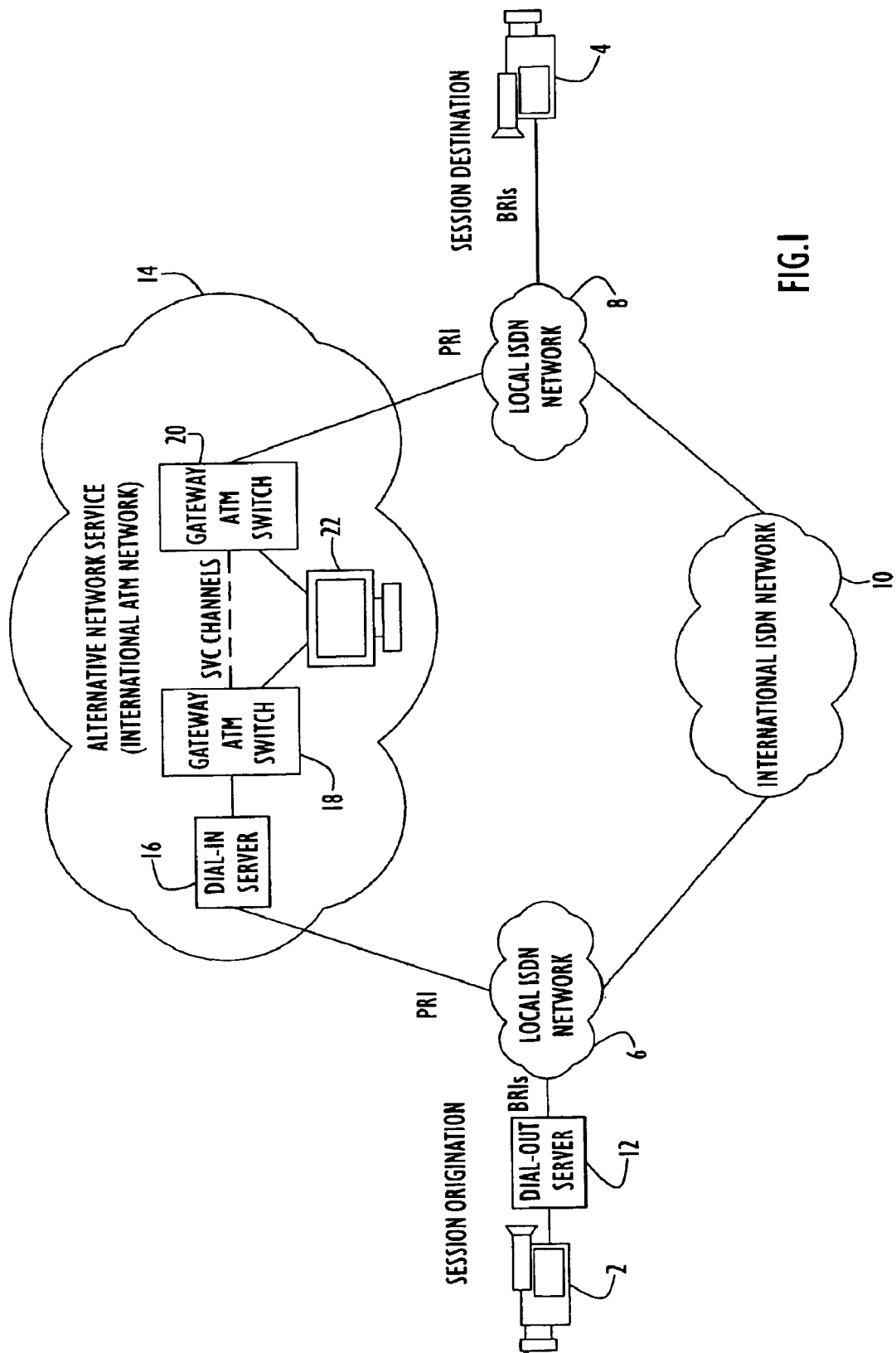
FIG. 1 is a depiction of the alternative network service showing elements of the service and the relationship of the alternative network to local and international ISDN networks.

The embodiments described below are with reference to the above drawings, in which like reference numerals designate like components.

Referring to FIG. 1, a long distance network is employed as an alternative to long distance ISDN services for use in dial-up video conferencing. The configuration shown in FIG. 1 includes the following elements:

1) H.320 compliant videoconferencing equipment at each end of the service, namely, an originating video conferencing unit 2 and a destination video conferencing unit 4.

2) Local ISDN networks 6 and 8 at each end of the service to provide access to the alternative network and a long distance ISDN service 10 for calls not carried by the alternative network.

3) An ISDN dial-out server 12 collocated with each H.320 codec that originates a session setup. This device controls route selection between the ISDN long distance network and an alternative network.

4) An alternative network 14, such as an international ATM network that supports channelized T1/E1 circuit emulation with ISDN Q.931 signaling to control B (64 kbps) channel switching and the capability to route and bill these calls based on the information received during the call setup process.

The alternative network 14, includes a dial-in server 16 coupled to the local ISDN network 6 to which the dial-out server 12 is connected. An ATM gateway switch 18 is connected to the dial-in server 16 and is one of a network of switches in the alternative network. The network of switches also includes ATM gateway switch 20 that is connected to the local ISDN network to which the destination video conferencing unit 4 is connected. The ATM network can also include administrative terminals 22 for managing the ATM network and performing billing functions.

The videoconferencing terminal equipment can be any of a large variety of H.320 compliant units produced by various manufacturers. Video codecs are usually packaged with video and audio systems to provide complete video conferencing terminals. PICTURETEL, TANDBERG, SONY and POLYCOM among others manufacture H.320 videoconferencing equipment, and there is a large installed base of H.320 compliant terminals.

Figure 2:
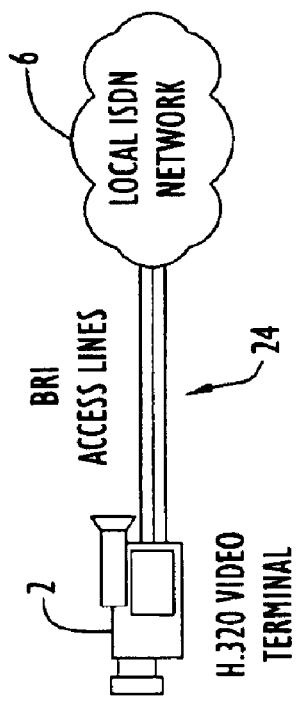
FIG. 2 illustrates an H.302 video conferencing terminal connected to an ISDN service provider for 384 kbps service using three BRI access lines.

The H.320 standard requires ISDN services, so if a user is operating with H.320 codecs, ISDN must be available in the locations of interest in order to implement the service. Although the H.320 standard supports both BRI and PRI access standards, most H.320 video codecs use multiple BRI arrangements. The most common configuration is three BRIs 24 to support 384 kbps (six B channels) as shown in FIG. 2.

The local ISDN service provides switched access between the video terminal and the alternative service network. PRI access is used to connect to the local ATM switch of the alternative network. This PRI access service is configured similar to a PBX access trunk. The twenty-three B channels are configured as a rotary trunk group in countries that have adopted the T1 standard (thirty B channels in E1 countries).

Figure 3:
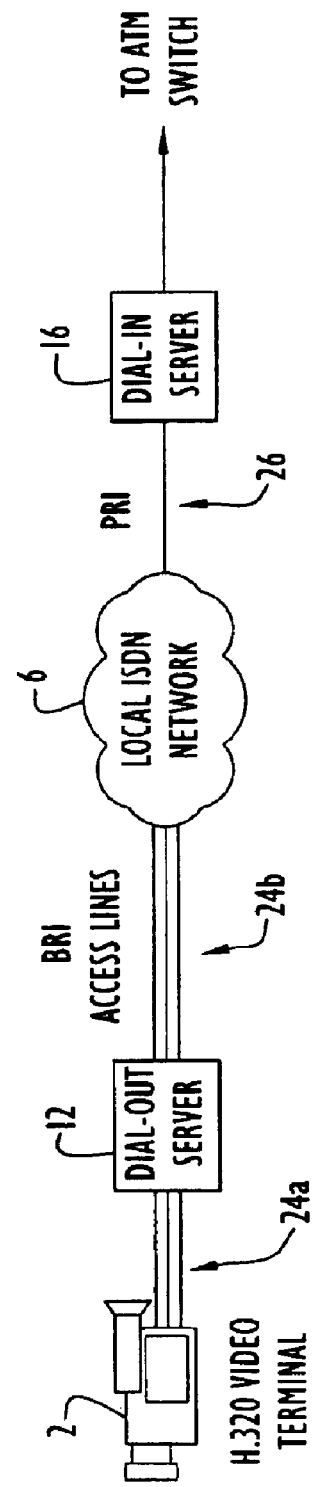
FIG. 3 shows the same application illustrated in FIG. 2 with the addition of ISDN dial-out and dial-in devices used to access the alternative network service through a local ISDN network.

FIG. 3 illustrates a typical three BRI configuration to support a H.320 terminal operating at 384 kbps, reconfigured to utilize the alternative service. The dial-out server provides routing to the alternative service by dialing the lead number of the PRI access facility. Configurations having more or fewer BRIs or a PRI can also be used. Here, the H.320 terminal 2 connects to the dial-out server 12 using the H.320 terminal's BRI connections 24a. The dial-out server 12 is coupled to a local ISDN network 6 through three BRI access lines 24b. The dial-in server 16 is coupled to the local ISDN network 6 by a PRI access line 26. The dial-in server 16 is also connected to an ATM switch in the alternative network.

The alternative network can be an international ATM network conforming to well-known ATM standards published by the ATM Forum. Examples of ATM switches that can be used in the system include an ALCATEL 7470 MULTISERVICES PLATFORM, formerly the NEWBRIDGE 36170 MULTISEVICES SWITCH. The connections to the ATM switches are through T1 (or E1) circuit emulation ports that support the ISDN PRI signaling protocol (Q.931). The PRI access lines 26 are connected to the ATM circuit emulation ports through dial-in servers.

Figure 4:
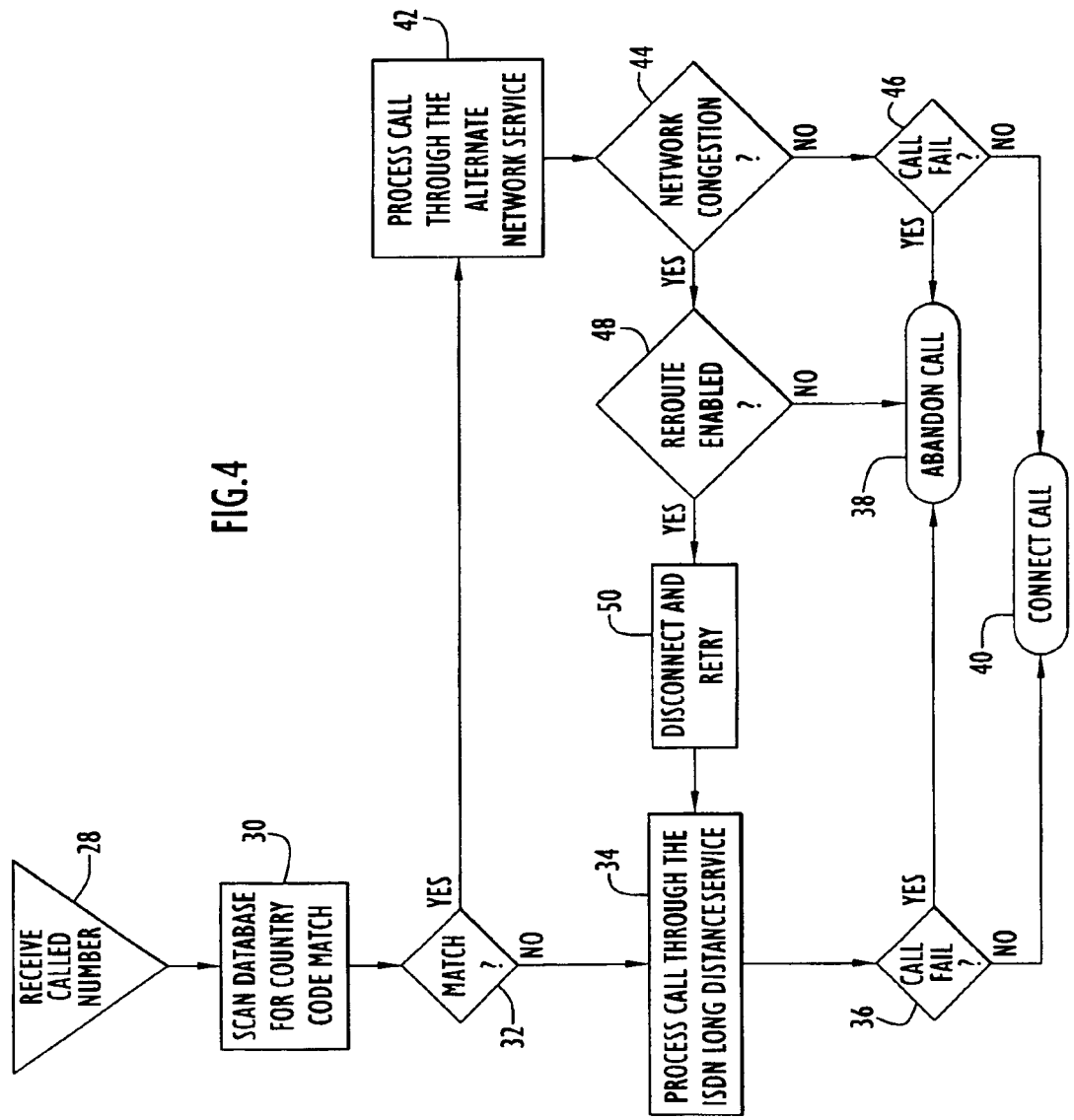
FIG. 4 is a flow diagram that illustrates the call processing of the ISDN dialers and includes an automatic reroute feature.

A flow chart describing a process for routing a call to the alternative network is shown in FIG. 4. In operation, the dial-out server monitors and intercepts a call setup messages on the D channel from the terminal equipment 28 and examines the address in the called number field of that message, such as by scanning an internal database or table of predetermined country codes 30. If the country code of the destination ISDN address is not a country served alternative network service, and hence, does not match one of the country codes stored in the dial-out server 32, the dial-out server forwards the call using the unaltered destination address as received from the terminal equipment to the local ISDN service provider for completion through the ISDN long distance network 34. If the call fails 36, the call is abandoned 38, otherwise the call is connected with the destination through the local ISDN network 40.

If the country code in the dialed address matches a country code stored in the dial-out server 32, the dial-out server calls the gateway in the alternative network through the local ISDN service in order to process the call through the alternative network 42. If the dial-out server sends a call to the alternative service provider and it is rejected because that network cannot complete the call due to network congestion or failure, the dial-out server will be so notified by a return message on the D channel 44. The dial-out server has an optional feature that permits these failed call attempts to be rerouted to the long distance ISDN network. If the rerouting feature is enabled 48 the server terminates the call attempt through the alternative network 50 and retries the call through the long distance ISDN network by sending a setup message on the D channel to the ISDN service provider using the unaltered address received from the terminal equipment 34. In this way the dialer can provide an automatic backup for the alternative service network using the long distance ISDN network. This mode is optional and may be disabled if this automatic reroute capability is not implemented. If the rerouting feature is not enabled 48, or if the call otherwise fails the through the alternative network 46, the call is abandoned 38.

Figure 5:
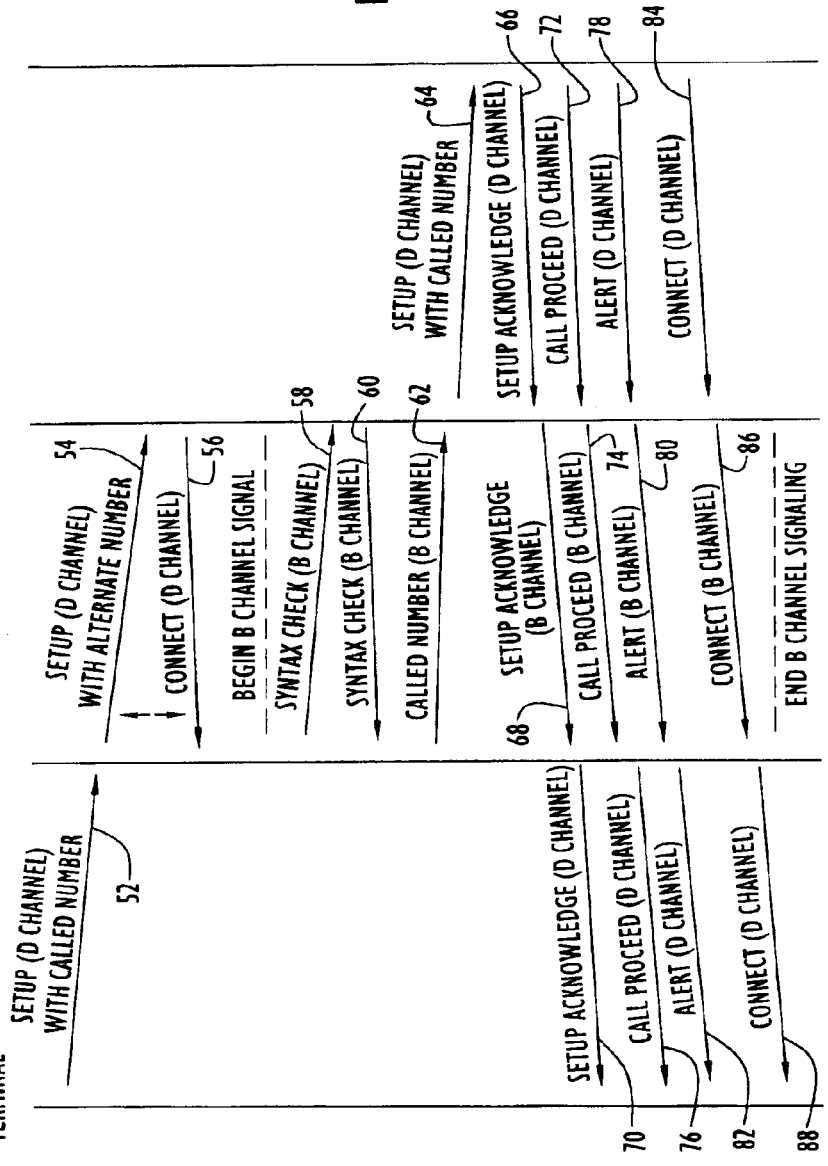
FIG. 5A illustrates a configuration using dial-out and dial-in servers to access an alternative network.
FIG. 5B is a message flow diagram illustrating messages used in setting up a long distance ISDN call using an alternative ATM network shown in FIGS. 1 and 5A.

FIGS. 5A and 5B illustrate the message flow in the system shown in FIG. 1. If the dial-out server determines that the alternative network services the destination of a call, the dial-out server 12 places a call to the dial-in server 16. As shown in FIG. 5B, the H.320 terminal sends a setup message 52 over the D channel that includes the called number indicating an address of a destination terminal. The dial-out server receives setup message 52 and determines from the country code in the called number that the call is to be routed over the alternative network. Accordingly, the dial-out unit sends a setup message 54 over the D channel of the local ISDN network 6 to the dial-in server 16. That setup message 54 includes the alternate number for the ATM switch 18 in the alternative network. The dial-in server 16 attached to the PRI access facility at the gateway switch site answers the call and responds with a connect message 56 over the D channel. The actual setup of this call involves the exchange of several signaling messages over the D channel between the H.320 codec and the dial-out server before the connect message is tendered. These have been omitted in FIG. 5B for the sake of simplicity. Accordingly, a data session is established between the dial-out and dial-in servers allowing those servers to pass information over the B channel. The B channel communication is established with syntax checking messages 58 and 60. Once a B channel session is established between the dial-out and dial-in servers, the dial-out server sends, over the B channel, a message 62 containing the destination ISDN number the H.320 terminal is attempting to call and a dial-out server identification code. The dial-in server receives the called number and uses it to generate a call setup message 64 for transmission of a D channel to the gateway ATM switch 18. The call setup message includes the destination ISDN number in a called number field and the dial-out server identification code in a calling number field. The gateway ATM switch 18 uses the called number to extend the call to the gateway ATM switch at the distant end. That switch completes the call to the terminal 4, shown in FIG. 1, corresponding to the destination ISDN address through the local ISDN network 8.

Upon establishing that connection the gateway ATM switch 18 sends over the D channel a setup acknowledgement message 66 to the dial-in server. A corresponding setup acknowledge message 68 is passed from the dial-in server to the dial-out server over the B-channel, and the dial-out server sends a similar message 70 over a D channel to the H.320 terminal. Further call proceed messages 72, 74 and 76; alert messages 78, 80 and 82; and connect messages 84, 86 and 88 are passed from the gateway ATM switch 18 by way of the dial-in server 16, the dial-out server 12, to the originating H.320 terminal.

During processing for call setup the gateway ATM switch at the originating end authenticates the dial-out server identification code. This is done by comparing the received code with a list stored in the gateway switch. If the received code is not found in the list, the call will be terminated. This provides security protecting the system against fraudulent use or for purposes other than the offered service. The call must originate from a registered dial-out server in order to be authenticated. The dial-out server identity is then used to identify the customer for billing. The identity code is written into the call detail record produced by the ATM switch for billing.

For calls received from the local ISDN service provider the dial-out server performs no function. These calls are passed transparently through the server to the customer's terminal equipment without modification.

The alternative network service is implemented, preferably, using digital switching and transmission technology that can provide high performance real time switched connectivity over long distances and has the capability to inter-work with local public ISDN services. The switching technology preferably is able to meet the ISDN signaling variants employed in each location where service is offered and provides the required signaling adaptations and conversions to permit inter-working across the network. The switching systems preferably also are able to translate the substitute ISDN addresses to the original addresses and provide routing to the appropriate destination switch on the network for delivery through the local ISDN service providers. The transmission systems should proved clear 64 kbps channels with low latency and low error rate, and should be free from all special voice conditioning such as voice compression or compander law conversion (A law/ μlaw).

The dial-in and dial-out servers can be maintainable by remote dial-in using one of the existing BRI or PRI channels. This permits the country code list and other relevant features to be centrally managed and downloaded to the servers. Each dial-out server can have a unique country code set and features tailored for that user from the specific location where the server is installed.

It will be understood that the present invention can be embodied using computer-programmed servers programmed to perform the functions described above. The computer programs can reside on any type of computer-readable medium. Further, the address processing, although described in terms of storing country code addresses in a server's memory, can be implemented in alternative manners, such as by having the information recorded in another type of media, such as a magnetic or optical disk. Further still, the invention can be embodied in hardware as opposed to being embodied in a computer program. In yet other embodiments, the address detection and processing features can be located at any point inclusively between the codec and the long distance ISDN network. For example, the address detection and processing features of the invention can be integrated into the video devices themselves, such as H.320 devices. The address detection and processing features preferably are located together; however, they can be separated if desired.

Existing ATM technology can be employed to embody the present invention such as by utilizing ALCATEL 7470 switches equipped with T1 and E1 channelized circuit emulation (CE) capability. AAL1 can be utilized to provide CBR adaptation. The adaptation interfaces also support Q.931 ISDN signaling in both T1 and E1 variants. The signaling can be mapped into ATM Q.2931 signaling that it is used to set up 64 kbps CBR SVC connections through the network between CE ports. The CE interfaces also have the capability to perform address screening on the received address and route the call based on the address.

Figure 6:
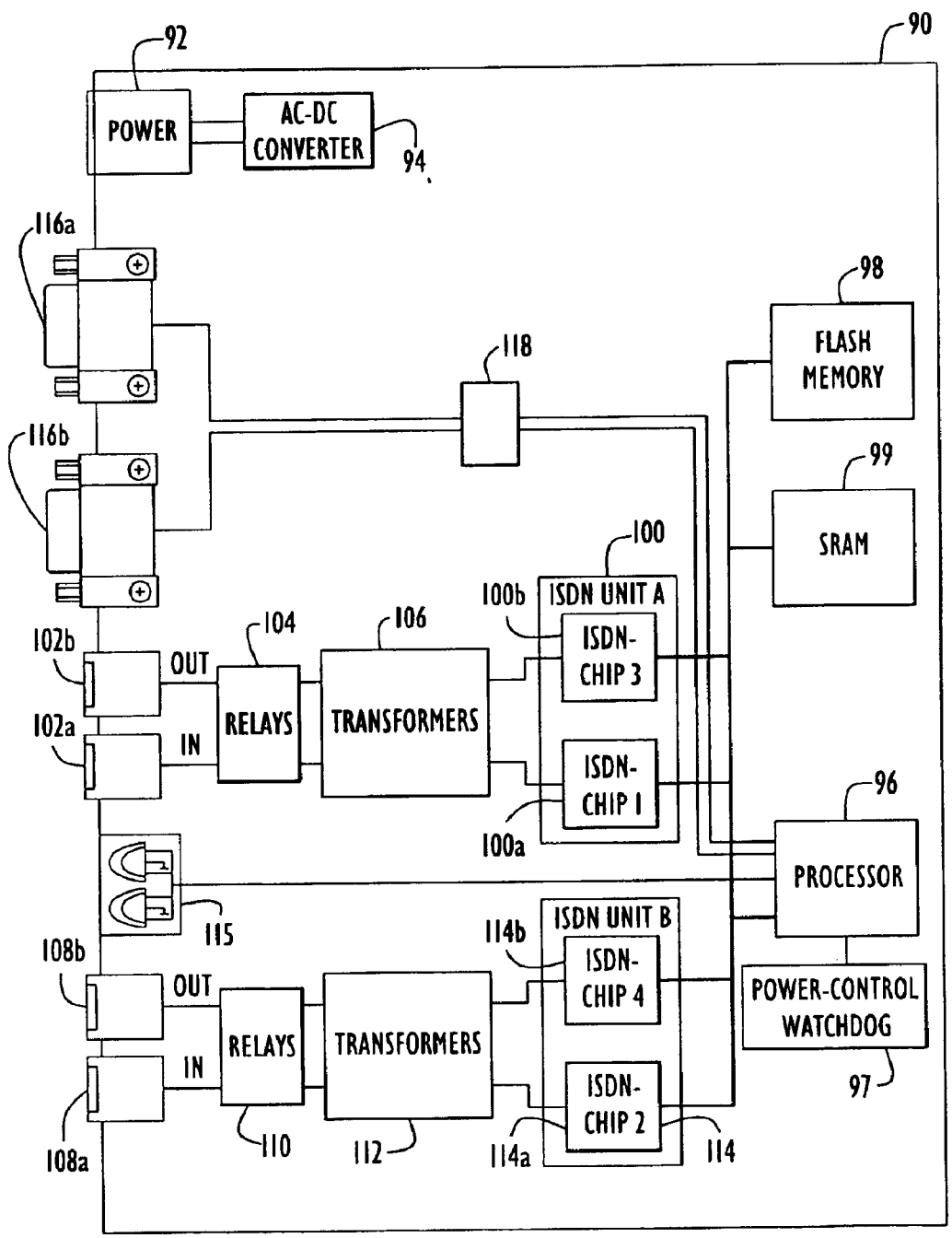
FIG. 6 is a block diagram of an embodiment of an ISDN dialer configured for use in accessing an alternative ATM network.

An example of a dialer that can be used as a dial-out server is shown in FIG. 6. FIG. 6 illustrates a BRI dialer with a memory unit suitable for storing instructions to operate the dialer as a dial-out server. The dial-out server 90 shown in FIG. 6 includes a power plug 92 for receiving AC power and an AC/DC converter 94 for converting the AC power to DC power for use throughout the unit. The dialer includes a processor 96 that is controlled by power-control watchdog circuit 97. This circuit provides general timing control and watchdog control for the processor. The processor is connected by a bus to an ISDN unit 100 that include circuits shown as ISDN chips 1 (100*a*) and 3 (100*b*). The ISDN unit operates to perform the ISDN protocol functions. Also coupled to the processor through the bus is a flash memory unit 98 that stores program instructions for controlling the processor, as well as information that needs to be stored in persistent memory, such as ISDN addresses for gateway ATM switches in the alternate network, or translation tables for translating ISDN addresses. An SRAM memory 99, also connected to the processor through the bus, is available for as non-persistent storage for holding operational data.

The dialer 90 includes input and output ports for connecting to networks. These ports conform to the RJ-45 standard, for example. Shown in FIG. 6 are input port 102*a* and output port 102*b*. The input port 102*a* can be connected to the H.320 codec 2 shown in FIG. 1, and the output port 102*b* can be connected to the local ISDN network 6 also shown in FIG. 1. The input and output ports are connected to relays in a relay unit 104 that is under control of processor 96, and are coupled through transformers in transformer unit 106 to the ISDN unit 100. ISDN chip 1 (100*a*) processes messages received on input port 102*a*. ISDN chip 3 (100*b*) processes message output on port 102*b*. A second set of ports, namely, input port 108*a* and output port 108*b* can be included in dialer 90. These ports similarly connect to relays in relay unit 110 and are coupled to a second ISDN unit 114 through transformers in transformer unit 112.

The processor 96 controls the operation of dialer 90 according to program instructions recorded in the computer-readable flash memory 98. The instructions can be loaded into SRAM 99 for execution by the processor 96. These instructions control the processor to operate the dialer 90 in accordance with the dial-out server described above.

The dialer 90 can include serial ports 116a and 116b that are coupled to the processor by way of a serial port circuit 118. A local terminal can connect to either of the serial ports for use in configuring or maintaining the dialer 90. The dialer 90 can also be configured remotely by way of the input and output ports. The software held within the flash memory can be downloaded from a central location by way of the input and output ports.

Figure 7:
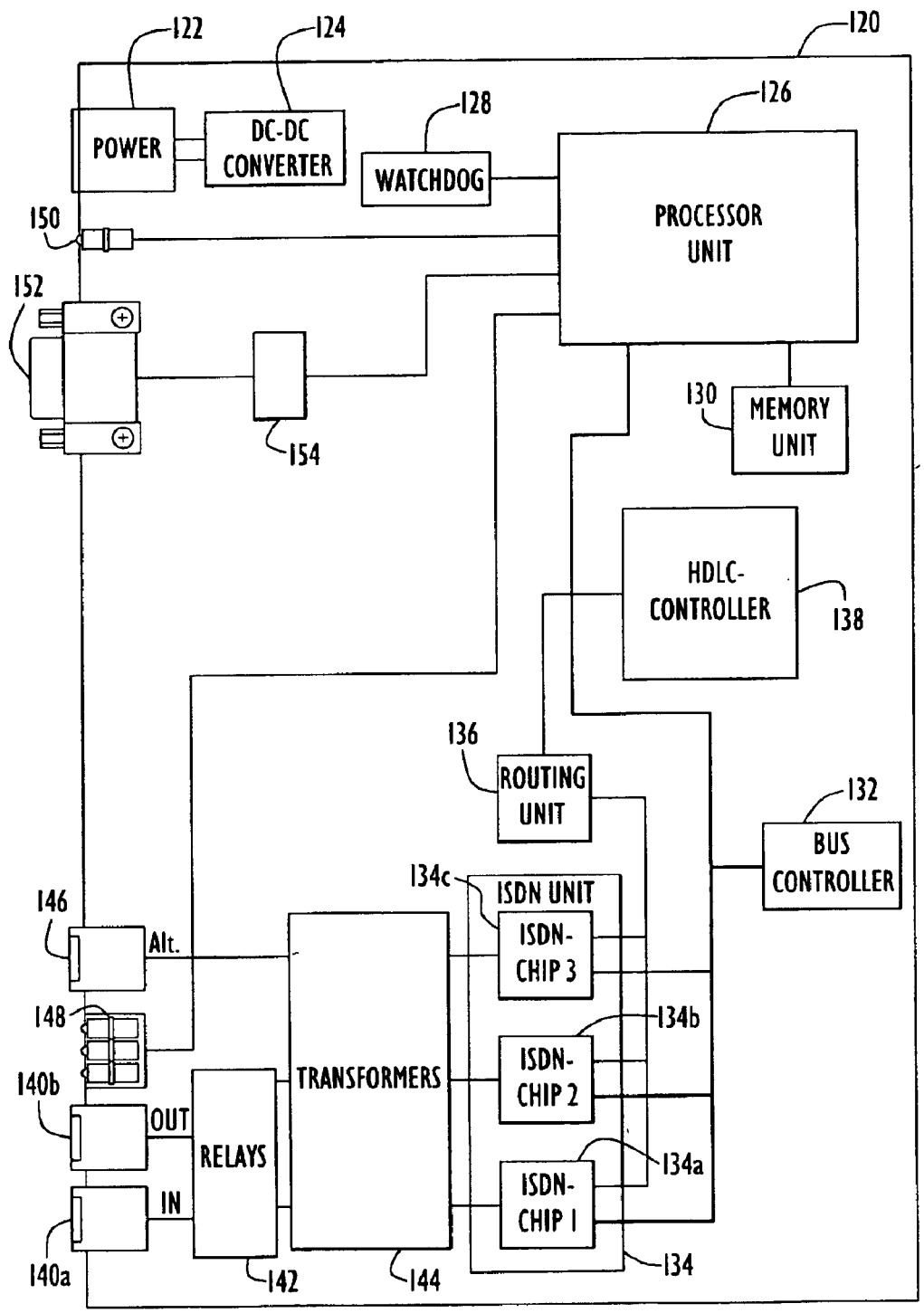
FIG. 7 is a block diagram of another embodiment of an ISDN dialer configured for use in accessing an alternative ATM network.

FIG. 7 shows an example of a PRI dialer 120 than can be programmed to operate as either the dial-out server or the dial-in server. The dialer 120 includes a power plug 122 that can accept DC power. A DC to DC converter 124 converts the power level to an appropriate level for use throughout the dialer. The dialer includes a processor unit 126 that is controlled by a watchdog timer circuit 128. Connected to the processor unit is a memory unit 130 that holds instructions for execution by the processor unit for controlling the dialer. The processor unit is coupled to a bus that is controlled by a bus controller 132. Coupled to the bus is an ISDN unit 134 that can include a plurality of ISDN control chips, such as ISDN chip 1 (134a), ISDN chip 2 (134b) and ISDN chip 3 (134c). The ISDN chips operate on incoming and outgoing messages in accordance with ISDN protocols.

Connected to the ISDN unit is a routing unit 136 that is controlled by an HDLC controller 138 for handling the lower level network protocols. The dialer 120 includes an input port 140a and an output port 140b that conform to the RJ-45 standard. Those ports are coupled through relays in relay unit 142 and transformers in transformer unit 144 to the ISDN unit 134. The dialer 120 can be configured with an alternate port 146 that couples through transformer unit 144 to ISDN unit 134. The dialer includes a series of indicator lights such as LEDs 148, controlled by processor unit 126, for indicating the ISDN status of the dialer. A power indicator 150, also controlled by the processor unit, indicates whether or not the dialer is powered on. A serial port 152 can be included in the dialer that is coupled through an interface circuit 154 to the processor unit. A local terminal can be connected to the serial port for controlling and maintaining the dialer. As with the BRI dialer 90, the PRI dialer can be maintained remotely, including having software downloaded to the unit for storage in memory unit 130.

Figure 8:
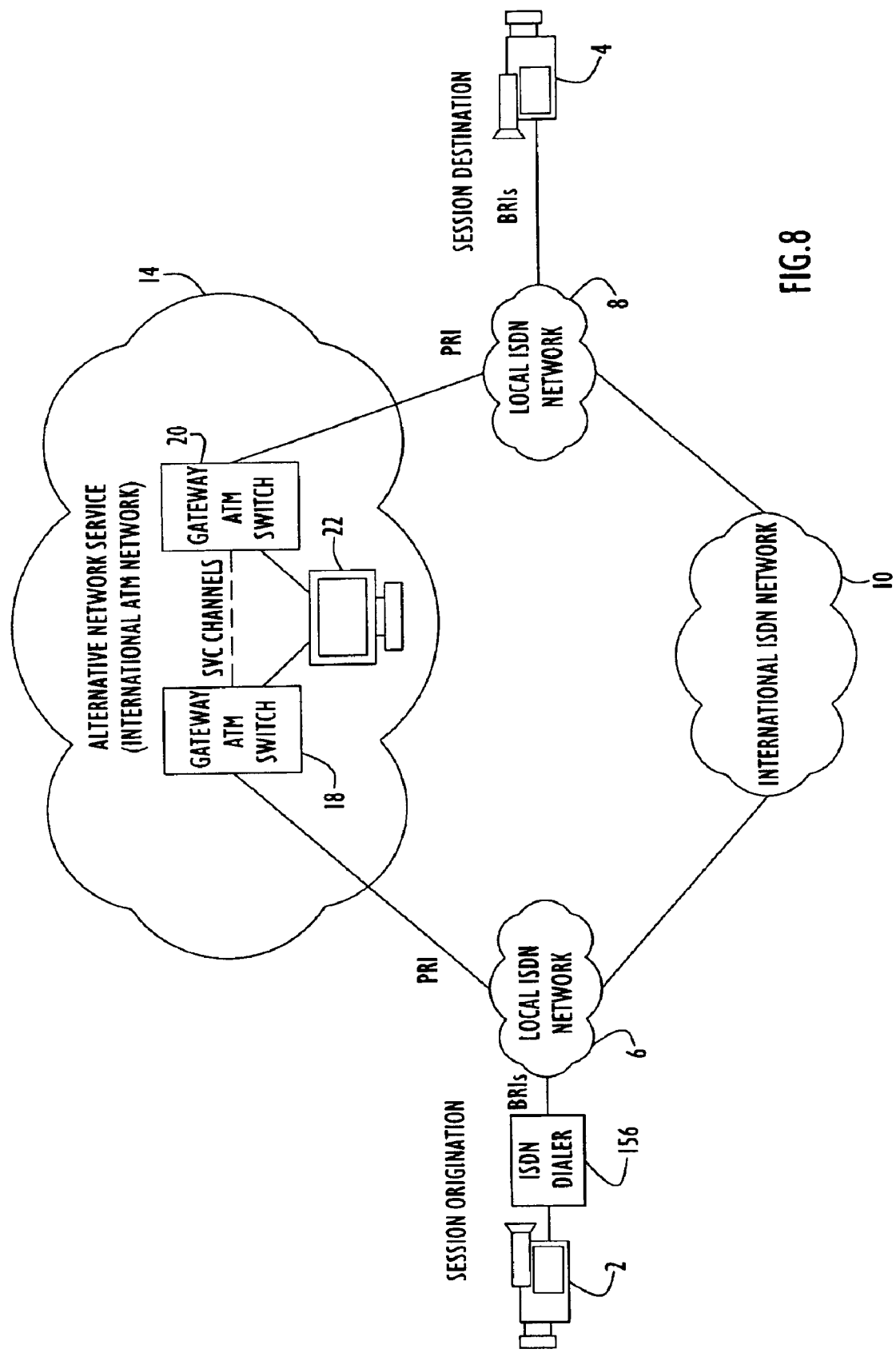
FIG. 8 is a depiction of the other alternative network service employing a signal dialer device and showing elements of the service and the relationship of the alternative network to local and international ISDN networks.

Another embodiment for routing calls over an alternative network, that employs a dialer located with the originating codec, but that does not use a dial-in server, is illustrated in FIG. 8. As shown in FIG. 8 the local ISDN network 6 provides switched access between the video equipment 2 and the alternative network 14. PRI access is used to connect the local ISDN network to the local gateway ATM switch 18 of the alternative network 14. An ISDN dialer 156 directs a call to any address in the assigned block to the trunk group, and this address appears in the signaling message on the D channel that sets up the connection. The ISDN dialer 156 translates the address which is used for subsequent routing by the alternative service network.

The ISDN dialer translates the address from the ISDN addresses received from the originating codec to a substitute local address used to access the alternative service provider. The dialer is installed in a typical three BRI configuration to support a H.320 terminal operating at 384 kbps. Configurations using more or fewer BRIs or a PRI also can be used. An appropriately programmed dialer can be used to perform the address translation and dialing functions. An example of such a dialer that can be programmed and used to connect to the ATM network is a MITEL SMART-1™ ISDN dialer. The invention is not limited to use of a MITEL dialer, and other types of dialers can be used. When the ATM switch 18 receives a message from the dialer, the switch transforms the message's narrowband ISDN (N-ISDN) protocol (Q.931) to a broadband ISDN protocol (Q.2931) for transmission over the ATM network.

In operation, referring to FIGS. 9A and 9B, the dialer 156, shown in FIG. 9A, monitors and intercepts the call setup message on the D channel 158, shown in FIG. 9B, from the terminal equipment and examines the address in the called number field. Stored within a memory of the dialer are predetermined addresses (e.g., 011 44 123 4567) of destinations with which the H.320 video terminal is expected to communicate. The memory also stores in association with those predetermined addresses, substitute addresses for use in routing the H.320 terminal's messages over the alternative network. These substitute addresses preferably are local N-ISDN addresses for directing the call to the alternative (e.g., ATM) network. The predetermined and substitute addresses can be recorded in a database in the dialer. Alternatively, those addresses can be recorded in association with each other in a table as shown below in Table 1.

TABLE 1

| Destination Address | Substitute Address |
|---|---|
| 011 44 123 4567 | 646 432 5678 |
| . | . |
| . | . |
| . | . |

If the address received from the H.320 terminal matches an address stored in the dialer's database, the dialer substitutes the corresponding substitute local N-ISDN address retrieved from its database for the received destination address and forwards the call to the local N-ISDN service provider over the D channel 160. The substitute address directs the call to the alternative network.

The alternative network (e.g., the ATM network) also has a copy of the predetermined destination address: substitute address association for its use in making a connection with the destination device and routing message destined for that device over the alternative network. The ATM switch 18 returns a setup acknowledge message over the D channel 162 and the ISDN dialer 156 then sends a setup acknowledge message to the H.320 terminal 2. The ATM switch also returns to the ISDN dialer, over the D channel, a call proceed message 166, an alert message 170 and a connect message 174, which the ISDN dialer than returns to the H.320 terminal in messages 168, 172 and 176, respectively.

For example, when a caller, in Frankfurt for example, dials a destination, in London for example, the dialer intercepts the number, translates it into the local assigned number and directs the call to the PTT (post, telephone, telegraph organization). The local PTT identifies the call as a number designated for use with the alternate long-distance network service. This can be accomplished by an alternative network organization "owning" certain local ISDN numbers at each site through a provisioned PRI trunk group. The PTT directs the call to the organization's switch in the alternate network, in which that switch also holds a translation table. The switch then translates the number back to the final destination number in London and forwards the call to the London switch. The London switch then connects the call through the local ISDN service provider in London.

The embodiment described here employs an enhanced dialer that monitors calls, detects specific addresses, and causes a call placed using the detected address to be directed over the alternative network. Such a dialer can include a computer-readable memory containing a table associating registered addresses with substitute addresses. Preferably, the memory contains enough capacity to hold all addresses, and their substitutes, that a operator of the terminal equipment desires to use to place a call.

According to another aspect of the invention, the dialer can be maintainable by remote dial-in using one of the existing BRI lines. This permits the translations to be centrally managed and downloaded to the codecs. Each dialer can have a unique set of translations tailored for that user from the specific location where the dialer is installed. The database can contain all of the destination ISDN numbers that the user registers for the alternative long-distance network service from that location. The database also contains a local substitute ISDN number for each registered destination number. This database can be routinely updated as the user adds or deletes destination addresses for use on the alternative long-distance network.

It will be understood that the present invention can be embodied using computer-programmed dialers, programmed to perform the functions described above. The computer programs can reside on any type of computer-readable medium. Further, the address substitution, although described in terms of storing addresses in a dialers memory, can be implemented in alternative manners, such as by having the address substitution recorded in another type of media, such as a magnetic or optical disk. Further still, the invention can be embodied in hardware as opposed to being embodied in a computer program. In yet other embodiments, the address detection and address substitution features can be located at any point inclusively between the codec and the long distance N-ISDN network. For example, the address detection and address substitution features of the invention can be integrated into the video devices themselves, such as H.320 devices. The address detection and address substitution features preferably are located together; however, they can be separated if desired.

Existing ATM technology can be employed to embody the present invention such as by utilizing ALCATEL 7470 switches equipped with T1 and E1 channelized circuit emulation (CE) capability. AAL1 can be utilized to provide CBR adaptation. The adaptation interfaces also support Q.931 N-ISDN signaling in both T1 and E1 variants. The signaling can be mapped into ATM Q.2931 signaling that it is used to set up 64 kbps CBR SVC connections through the network between CE ports. The CE interfaces also have the capability to perform address translation on the received address and route the call based on the translated address. Using this capability, the calls using the substitute address resulting from the dialer translation and connected via the local N-ISDN network are translated back to the original destination addresses by the CE interface and forwarded trough the network.

Having described embodiments of an alternative network service, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of establishing a communication connection between a first terminal and a second terminal, wherein the first and second terminals are configured for communicating over a primary network, the method comprising:

receiving at a dial-out unit a first call setup message from the first terminal over a first signaling channel, the first call setup message including an identifier of the second terminal;

determining whether to establish a communication session between the first and second terminals over an alternative network based on the identifier of the second terminal;

outputting from the dial-out unit to a dial-in unit, over a data channel, the identifier of the second terminal; and outputting from the dial-in unit to the alternative network, over a second signaling channel, a second call setup message and the identifier of the second terminal, wherein the alternative network is an asynchronous transfer made (ATM) network, the first and second signaling channels are ISDN D-channels, and the data channel is an ISDN B-channel.

2. The method of claim 1, wherein the primary network is an integrated services digital network (ISDN).

3. The method of claim 1, further comprising:

receiving from the alternative network, over the second D-channel, a D-channel connection message indicating that a connection with the second terminal is established;

sending a B-channel connection message over the B-channel to the dial-out unit in response to receiving the D-channel connection message; and sending a D-channel connection message from the dial-out unit to the first terminal in response to the B-channel message for indicating to the first terminal that a connection is established with the second terminal.

4. The method of claim 1, wherein the first and second terminals conform to ITU-T Recommendation H.320.

5. The method of claim 1, further comprising:

outputting from the dial-out unit, over the data channel, an identifier of the dial-out unit; and determining, based on the identifier, if the dial-out unit is authorized to use the alternative network, wherein the dial-out unit outputs the second call setup message only if the dial-out unit is determined to be authorized to use the alternative network.

6. A method of establishing a communication connection over an alternative network between first and second terminals configured for communicating over a primary network, comprising:

receiving a first call setup message on a first signaling channel, the first call setup message containing an identifier for communicating with the second terminal;

determining if the identifier in the first call setup message corresponds to predetermined location information;

initiating the sending of a second call setup message to the alternative network in response to determining that the identifier in the call setup message corresponds to the predetermined location information;

bridging the first and second signaling channels with a data channel;

receiving over the data channel call setup information from the alternative network concerning the second terminal; and outputting said call setup information over the first signaling channel to the first terminal, wherein the primary network is an integrated services digital network (ISDN), the first and second signaling channels are ISDN D-channels, and the data channel is an ISDN B-channel.

7. The method of claim 6, wherein the alternative network is an asynchronous transfer mode (ATM) network.

8. The method of claim 6, wherein the identifier is an ISDN destination address of the second terminal.

9. The method of claim 6, wherein the first and second terminals are video codec units conforming to ITU-T Recommendation H.320.

10. The method of claim 6, wherein the identifier in the call setup message is an address of the second terminal.

11. The method of claim 10, wherein the address of the second terminal includes a country code and said address is determined to correspond to the predetermined location information if the country code corresponds to a country serviced by the alternative network.

12. An apparatus for establishing a call between a first terminal and a second terminal, wherein at least the first terminal is configured for communicating over a primary network, by using an alternative network, the apparatus comprising:

a terminal port suitable for connecting to the first terminal;

a network port suitable for connecting to a local network;

a network protocol unit connected to the terminal and network ports;

a processor connected to the network protocol unit; and a memory unit connected to the processor, wherein the memory unit includes:

an alternative network address storage area configured for storing at least one address for communicating with the alternative network, a service location storage area configured for storing at least one indicator of location serviced by the alternative network, and an instruction area having stored therein instructions for controlling the processor to determine, based on an identifier of the second terminal contained in a call setup message received from the first terminal by way of the terminal port, if the alternative network services an area in which the second terminal is located;

output from the network port a call setup message addressed to the alternative network in response to determining that the alternative network services an area in which the second terminal is located, and output from the network port an address of the second terminal, wherein the primary network is an integrated service digital network (ISDN), the call setup message received by the terminal port is received over an ISDN D-channel, and the call setup message and address of the second terminal output from the network port are output over an ISDN B-channel.

13. The apparatus of claim 12, wherein the instruction area has further instructions stored therein for controlling the processor to output a connect message to the terminal port for indicating to the first terminal establishment of a connection with the second terminal.

14. The apparatus of claim 12, wherein the secondary network is an asynchronous transfer mode (ATM) network.

15. The apparatus of claim 12, wherein the instruction area has further instructions stored therein for controlling the processor to receive changes to said at least one indicator of a location serviced by the alternative network.

16. The apparatus of claim 12, wherein the apparatus is an ISDN dialer.

17. The apparatus of claim 12, wherein the instruction area includes instructions for controlling the processor to output an indicator of the identify of the apparatus.

18. A computer-readable medium of instructions, suitable for use in a device for establishing a call between a first terminal and a second terminal, wherein at least the first terminal is configured for communicating over a primary network, by using an alternative network, the computer-readable medium of instructions comprising:

program instructions for determining, based on an identifier of the second terminal contained in a call setup message received from the first terminal by way of the terminal port, if the alternative network services an area in which the second terminal is located;

program instructions of outputting from the network port a call setup message addressed to the alternative network in response to determining that the alternative network services an area in which the second terminal is located; and program instructions for outputting from the network port an address of the second terminal, wherein the call setup message is output on an ISDN D-channel, and the address of the second terminal is output on an ISDN B-channel.

19. The computer-readable medium of instructions of claim 18, wherein the primary network is an integrated services digital network (ISDN) and the alternative network is an asynchronous transfer mode (ATM) network.

20. The computer-readable medium of instructions of claim 18, wherein the first and second terminals conform to ITU-T Recommendation H.320.

21. The computer-readable medium of instructions of claim 18, wherein the identifier in the call setup message is an address of the second terminal.

22. The computer-readable medium of instructions of claim 21, wherein the address of the second terminal includes a country code and said alternative network is determined to service an area in which the second terminal is located address if the country code corresponds to a country serviced by the alternative network.

23. A method of establishing a communication connection over an alternative network between first and second terminals configured for communicating over a primary network, comprising:

receiving a call setup message over a signaling channel for establishing a connection with the second terminal over the alternative network;

receiving an address of the second terminal over a data channel;

sending a message with the address of the second terminal to the alternative network for establishing a connection with the second terminal, in response to receipt of the call setup message; and sending an indication over the data channel that the alternative network has established a connection with the second terminal, wherein the primary network is an integrated services digital network (ISDN), the first and second signaling channels are ISDN D-channels, and the data channel is an ISDN B-channel.

24. The method of claim 23, wherein the alternative network is an asynonous transfer mode (ATM) network.

25. The method of claim 23, wherein the address is an ISDN destination address of the second terminal.

26. The method of claim 23, wherein the first and second terminals conform to ITU-T Recommendation H.320.

27. The method of claim 23, wherein the identifier in the call setup message is an address of the second terminal.

28. The method of claim 23, further comprising:
receiving an indicator of the identify of an originator of the call setup message; and
based on the indicator determining if said originator is authorized to use the alternative network.

29. An apparatus for establishing a call between a first terminal and a second terminal, wherein at least the first terminal is configured for communicating over a primary network, by using an alternative network, the apparatus comprising:
a local network port suitable for connecting to a local network;
an alternate network port suitable for connecting to a switch in the alternate network;
a network protocol unit connected to the local and alternate network ports;
a processor connected to the network protocol unit;
a memory unit connected to the processor, wherein the memory unit includes instructions for controlling the processor to extract the second terminal address from a data channel message received via the local network port; outputting from the alternate network port a message containing the address of the second terminal for controlling the alternate network switch to make a connection with the second terminal; and
outputting from the local network port a message on the data channel indicating establishment of a connection with the second terminal,
wherein the local network is an integrated services digital network (ISDN) and the data channel is an ISDN B-channel.

30. The apparatus of claim 29, wherein the primary network is an integrated services digital network (ISDN).

31. The apparatus of claim 30, wherein the alternative network is an asynchronous transfer mode (ATM) network.

32. The apparatus of claim 30, wherein the address of the second terminal is an ISDN destination address of the second terminal.

33. The apparatus of claim 29, wherein the first and second terminals conform to ITU-T Recommendation H.320.

34. The apparatus of claim 29, wherein the memory unit includes instructions for controlling the processor to determine if an originator of a message containing said second terminal address is authorized to use the alternative network.

35. An apparatus for establishing a call between a first terminal and a second terminal, wherein at least the first terminal is configured for communicating over a primary network, by using an alternative network, the apparatus comprising:
a local network port suitable for connecting to a local network;
an alternate network port suitable for connecting to a switch in the alternate network;
a network protocol unit connected to the local and alternate network ports;
a processor connected to the network protocol unit; and
a memory unit connected to the processor, wherein the memory unit includes instructions for controlling the processor to extract the second terminal address from a data channel message received via the local network port; outputting from the alternate network port a message containing the address of the second terminal for controlling the alternate network switch to make a connection with the second terminal; outputting from the local network port a message on the data channel indicating establishment of a connection with the second terminal,
wherein the alternate network port connects to an integrated services digital network (ISDN) and message output from the alternate network port is output over an ISDN D-channel.

36. The apparatus of claim 35, wherein the primary network is an integrated services digital network (ISDN).

37. The apparatus of claim 36, wherein the alternative network is an asynchronous transfer mode (ATM) network.

38. The apparatus of claim 36, wherein the address of the second terminal is an ISDN destination address of the second terminal.

39. The apparatus of claim 35, wherein the first and second terminals conform to ITU-T Recommendation H.320.

40. The apparatus of claim 35, wherein the memory unit includes instructions for controlling the processor to determine if an originator of a message containing the second terminal address is authorized to use the alternative network.

41. A computer-readable medium of instructions, suitable for use in a device for establishing a call between a first terminal and a second terminal by using an alternative network, wherein at least the first terminal is configured for communicating over a primary network, the computer-readable medium of instructions comprising:
program instructions for extracting an address of the second terminal from a received data channel message;
program instructions for outputting to a switch of the alternative network a message containing the address of the second terminal for controlling the alternate network switch to make a connection with the second terminal; and
program instructions for outputting a data channel message indicating establishment of a connection with the second terminal,
wherein the primary network is an integrated services digital network (ISDN), the alternative network is an asynchronous transfer mode (ATM) network, and the received and output data channel messages are a message received and output on an ISDN B-channel, respectively.

42. The computer-readable medium of instructions of claim 41, wherein the first and second terminals conform to ITU-T Recommendation H.320.

* * * * *